C. H. VIDAL.
SPRING TIRE FOR WHEELS OF VEHICLES.
APPLICATION FILED AUG. 29, 1911.
1,080,129.
Patented Dec. 2, 1913.
2 SHEETS—SHEET 1.
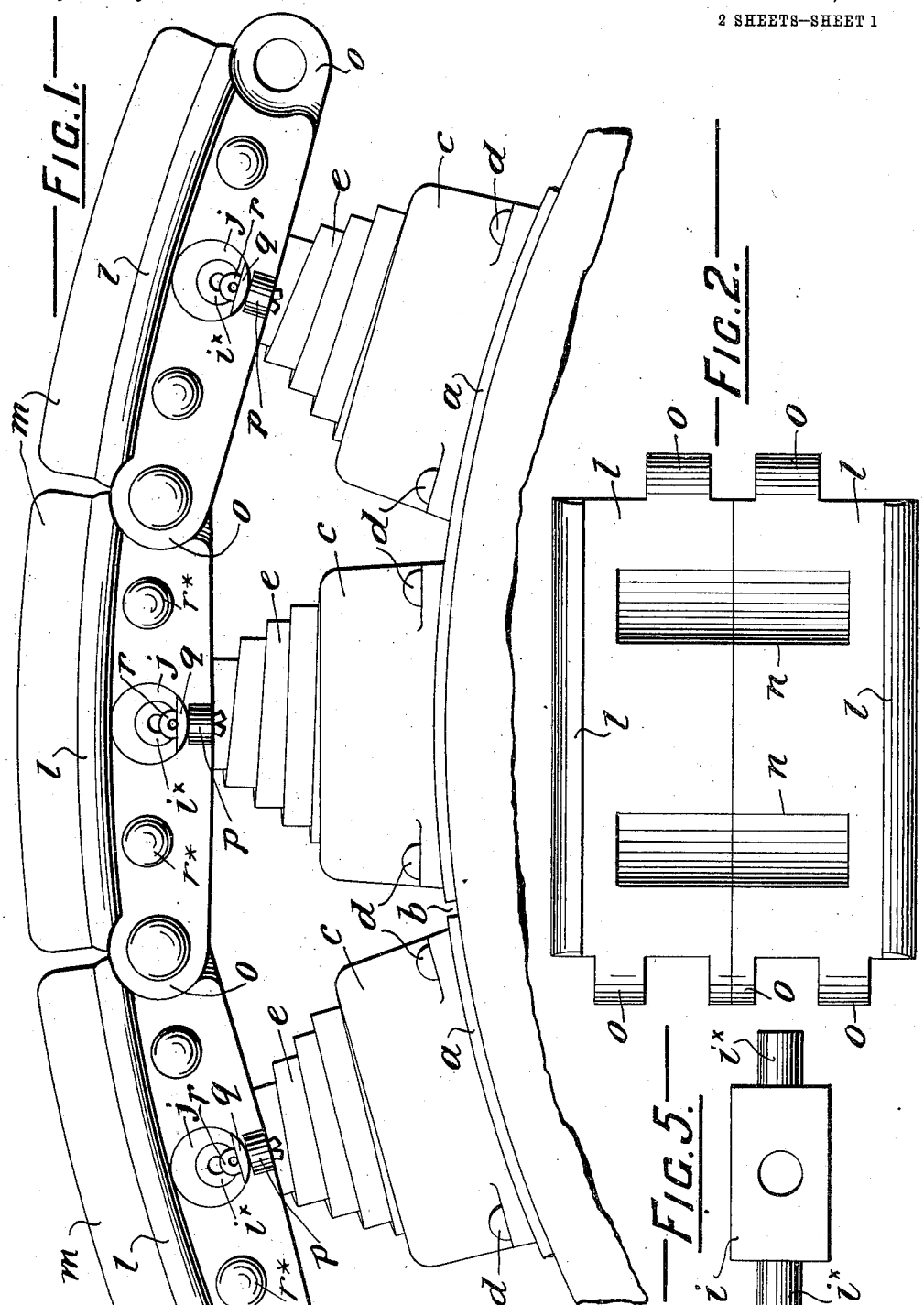

C. H. VIDAL.
SPRING TIRE FOR WHEELS OF VEHICLES.
APPLICATION FILED AUG. 29, 1911.
1,080,129.
Patented Dec. 2, 1913.
2 SHEETS—SHEET 2.
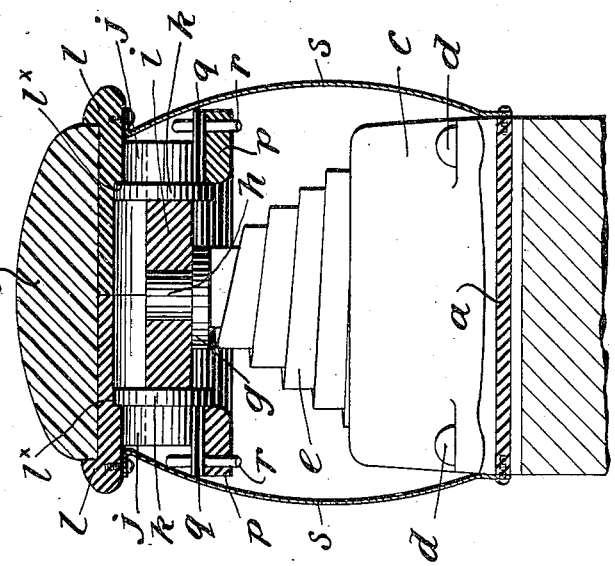
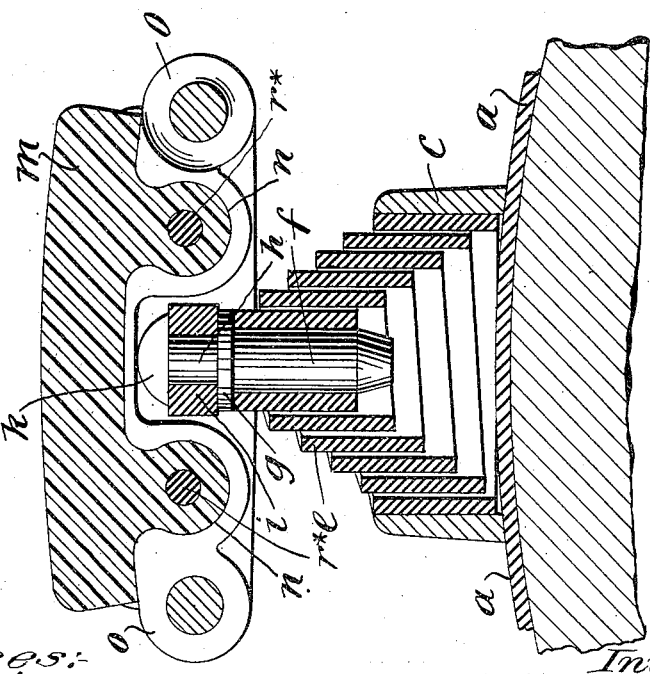

UNITED STATES PATENT OFFICE.

CHARLES HENRY VIDAL, OF CHISWICK, ENGLAND.

SPRING-TIRE FOR WHEELS OF VEHICLES.

1,080,129.      Specification of Letters Patent.      Patented Dec. 2, 1913.

Application filed August 29, 1911. Serial No. 646,667.

*To all whom it may concern:*

Be it known that I, CHARLES HENRY VIDAL, a subject of the King of Great Britain, and resident of 22 Park road, Chiswick, Middlesex, England, electrical engineer, have invented new and useful Improvements in Spring-Tires for the Wheels of Vehicles, of which the following is a specification.

The present invention has reference to the tires of wheels for vehicles which are composed of inner and outer rings or bands between which there is an annular space wherein are arranged the springs which give resiliency to the wheel.

The object of my invention is to provide a detachable spring tire which will be easy to apply to the rim of the wheel and which will retain itself in position by means of its springs.

According to the present invention the springs within the annular space between the rings or bands are so fitted as to be in repose and to allow the inner ring which is divided transversely to expand sufficiently to easily fit over the wheel rim. When the tire is fitted on to the rim of the wheel the springs are cramped and retained in a cramped condition by means of keys, or other suitable devices. This has the effect of compressing the inner band of the tire onto the rim of the wheel and making it bind thereon so strongly that it cannot be removed except by releasing the springs and allowing them to regain their state of repose.

Various forms of springs may be used, but after considerable experiment, the form of spring and the method of cramping which I prefer are as I have illustrated in the accompanying drawings.

In these drawings:—Figure 1 is a side elevation of a portion of the tire showing the tire in position with the springs cramped. Fig. 2 is a top plan view of a single element of the tire with the tread portion removed. Fig. 3 is a sectional side elevation of a single element of the tire. Fig. 4 is a sectional end elevation of a single element of the tire. Fig. 5 is a detail view of the saddle piece described later.

*a* is the inner band of the tire divided transversely as at *b* (Fig. 1).

*c* are slightly tapered cups (which can be securely fastened by rivets *d* to the band *a*) into which are forced upward with great pressure the springs *e* till their bottom edges are flush with the bottom of the cups. Into the top of the springs *e* the beveled-ended pins *f* are forced home till the shoulder *g* bears against the top end of the springs. By this means the springs are absolutely fast within the cups and on the pins, and can only be dislodged by great force. Above the shoulder *g* on the pins *f* extends a cylindrical head *h* on which is fitted loosely a saddle piece *i*. This loose fit enables the springs to be distorted without straining any other parts. Over the ends $i^x$ (see Fig. 5) of this saddle piece are fitted eccentrics *j*, which eccentrics are to be used for cramping the springs when the tire is fitted on to the wheel. The eccentrics are formed with flanges *k* and lugs *q*. The shoe *l* is divided longitudinally into two pieces which are fitted over the eccentrics when they are in position and riveted together. The eccentrics are thus retained in position by the edges $l^x$ bearing against their flanges *k*. The shoe *l* is further provided with lugs *p*. To cramp the springs the eccentrics *j* are turned by a suitable key so that their lugs *q* are located immediately over the lugs *p*. Pins *r* are then inserted through corresponding holes in the lugs *p* and *q* and the springs are retained in their cramped position. When the springs are cramped the inner band *a* binds on the rim of the wheel so tightly that it cannot be moved.

Tread portions may be made of rubber or other material and provided with lugs (as shown in Fig. 3) fitting into hollows in the shoe. Fixing bars $r^*$ are passed through holes in the lugs and fixed in the sides of the shoes. The shoes are hinged together as at *o*.

Side covers of canvas or other material may be fitted as at *s* in order to keep dust out of the tire.

It will be clear from the foregoing description that the tire is first built up from its elements, any of which may be easily replaced. With the springs at rest it is slipped over the rim of the wheel. (If the rim is flanged it will be necessary to remove one of the shoe hinge pins). The springs are then cramped one at a time by a suitable key and the tire is fast on the rim.

What I claim and desire to secure by Letters Patent of the United States is:—

A detachable spring tire comprising an inner band and a peripheral member, cups attached to the inner band, volute springs forced into said cups, pins inserted into the outer ends of the springs, saddle pieces carried by the pins, and eccentrics mounted on the saddle pieces in coöperative relation to the peripheral member whereby the turning of the eccentrics will cramp the springs, substantially as and for the purpose described.

In testimony whereof I have signed my name to this specification in the presence of two subscribing witnesses.

CHARLES HENRY VIDAL.

Witnesses:
L. A. NEWTON,
ALFRED S. BISHOP.

Copies of this patent may be obtained for five cents each, by addressing the "Commissioner of Patents, Washington, D. C."